United States Patent [19]
Klein

[11] 3,970,007
[45] July 20, 1976

[54] SALVAGE SWITCH

[75] Inventor: Joseph R. Klein, East Northport, N.Y.

[73] Assignee: The United States of America as represented by the Secretary of the Air Force, Washington, D.C.

[22] Filed: Jan. 20, 1971

[21] Appl. No.: 112,492

Related U.S. Application Data

[63] Continuation-in-part of Ser. No. 743,906, July 10, 1968, abandoned.

[52] U.S. Cl. .............................. 102/70.2 P; 176/22; 176/38; 337/326
[51] Int. Cl.² ........................................ F42C 13/00
[58] Field of Search ...................... 102/70; 337/326; 176/22, 38

[56] References Cited
UNITED STATES PATENTS

| | | | |
|---|---|---|---|
| 2,110,552 | 3/1938 | Hayden | 102/70 B |
| 2,900,908 | 8/1959 | Burrell | 102/70 |

*Primary Examiner*—Verlin R. Pendegrass
*Attorney, Agent, or Firm*—Joseph E. Rusz; Jacob N. Erlich

[57] ABSTRACT

A salvage switch having a case which has therein a cartridge for containing a gas, an actuator and a spring for holding the cartridge in an inoperative position. Located beneath the case is a container having a hollow pin and containing a hydride. Upon actuation of the actuator the cartridge is forced forward against the force of the spring into an operative position wherein the hollow pin penetrates the cartridge.

10 Claims, 1 Drawing Figure

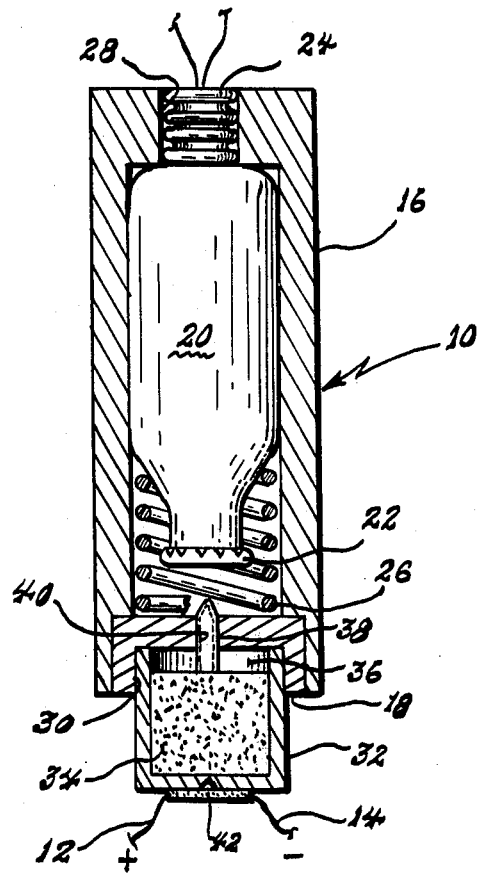

SALVAGE SWITCH

BACKGROUND OF THE INVENTION

This application is a continuation-in-part of application Ser. No. 743,906 filed July 10, 1968, and now abandoned.

This invention relates generally to a switch for actuating a device when the neutron exposure exceeds a predetermined threshold level and, more particularly, to a switch which will activate a device such as a signaling device on a power plant when the neutron exposure exceeds the predetermined threshold level, thereby preventing damage to the power plant which would normally occur due to such excessive neutron exposure.

In our development of nuclear power plants, it is desirable to construct a plant which will meet all the required safety criteria. Thus, it becomes essential to control the operation of such a plant when the neutron exposure exceeds a predetermined level. Such a control can be accomplished by, for example, the removal of the moderator such as water, of the power plant or the reinsertion of the control or safety rods. Furthermore, it is necessary in many instances for an additional signal to be generated under the high neutron condition in order to protect personnel.

It has heretofore been a major problem to develop a switch which will prevent damage to any sensitive apparatus, such as a power plant, by determining when the order of magnitude of such incident neutron radiation is beyond a predetermined safe level and thereby actuating the safety devices or signaling means associated with such a power plant.

It has also been a problem to develop a switch which will detonate the warhead of a re-entry vehicle or any other such device when the order of magnitude of incident neutron radiation is between the melting and vaporization levels and thereby salvage some of the value of, for example, the weapon. Such a reduced yield produced by the salvaging operating may still have useful ground damage effects. In other words, it has been concluded that if a full-scale detonation of the offensive weapon cannot be achieved, a partial yield is preferable to no yield at all.

A further problem encountered in the radiation switch development is that the premature operation of the switch must be very small. This includes the unnecessary activation of the switch in the face of a less than lethal environment, due to the inaccuracy of the switch. If the switch thresholds and activates at a level substantially less than that at which the power plant will be damaged, the reliability of the power plant has essentially been lowered to that of the level of the switch. Furthermore, the switch must be able to survive a non-lethal encounter just prior to a lethal one.

SUMMARY OF THE INVENTION

The salvage switch of the instant invention overcomes all of the above-mentioned problems. The instant radiation switch will perform any kind of suitable switching operation as in a power plant in the manner set forth hereinabove or detonate the warhead of a ballistic re-entry vehicle when the neutron exposure exceeds a predetermined damage threshold, thereby preventing destruction or damage to the device to which it is attached.

The function of the instant invention is to sense the existence of neutron radiation of sufficient intensity and spectrum and to activate, for example, the safety devices or signaling means attached to a power plant.

The salvage switch of the instant invention uses the evolution of hydrogen from $UH_3$ (uranium hydride) as the sensor. This sensor utilizes the exothermic absorption of hydrogen to raise the temperature to 500°C. The hydrogen is initially stored in a cartridge similar to the $CO_2$ cartridges used in air rifles. Upon actuation of a remotely fired squib operated bellows actuator, the cartridge is driven against a spring to impact a hollow pin. The pin punctures the cartridge cap and allows the hydrogen to flow into the $UH_3$ container, whereupon the $UH_3$ powder absorbs the hydrogen and soon has its temperature raised to 500°C. The hydrogen enters the container through a small orifice so that leakage out of the orifice will be small when the sensor is subjected to a threshold neutron pulse. Subjection to this threshold neutron pulse causes a sharp pressure build-up in the $UH_3$ container which is at 500°C thereby rupturing a scored lid on the container and simultaneously breaking a normally closed circuit which is attached thereto. The breaking of the circuit causes activation of safety devices or signaling means attached to a power plant.

In other words, the instant device utilizes $UH_3$ as the sensitive part. As the radiation causes the uranium atoms to fission, 37.1 calories of heat per gram is evolved. This heat is used to drive off the attached hydrogen creating increased pressure. As heretofore disclosed this increased pressure ruptures a scored lid on the $UH_3$ container breaking a normally closed circuit. By properly choosing the size of the container and the proper proportions of sensitive uranium hydrides, various threshold radiations can be sensed.

It is therefore an object of this invention to provide a salvage switch which will activate a safety device when the neutron exposure exceeds its damage threshold.

It is another object of this invention to provide a salvage switch which has an arming mechanism which will not function until after a preliminary arming signal is given.

It is a further object of this invention to provide a salvage switch whose percentage of failure is at a minimum.

It is still another object of this invention to provide a salvage switch which will survive a non-lethal encounter just prior to a lethal one.

It is still a further object of this invention to provide a salvage switch which is economical to produce and which utilizes conventional, currently available components that lend themselves to standard mass production manufacturing techniques.

For a better understanding of the present invention, together with other and further objects thereof, reference is had to the following description taken in conjunction with the accompanying drawing, and its scope will be pointed out in the appended claims.

DESCRIPTION OF THE DRAWING

The FIGURE of the drawing represents a side elevation view, in cross-section, of the salvage switch of the instant invention.

DESCRIPTION OF THE PREFERRED EMBODIMENT

Referring now to the FIGURE of the drawing, the salvage switch 10 of the instant invention is shown in cross-section.

The salvage switch 10 may be operatively connected by a circuit, part of which is made up of wires 12 and 14, to any device such as a signaling device on a power plant (not shown) which is to be activated when the neutron exposure exceeds a predetermined damage threshold. Another such device may be in the form of nuclear ballistic re-entry vehicle and the salvage switch 10 of the instant invention may be located anywhere in the vehicle that does not interfere with the performance of other components.

The salvage switch is constructed of a protective case 16 having a plug 18 fixedly secured by any suitable holding means to the bottom thereof and being made of any suitable material. Within case 16 are located a container such as cartridge 20 for containing a suitable gas such as hydrogen ($H_2$) and having a puncturable closure element 22 at one end thereof, any suitable remotely fired actuator such as remotely fired squib actuator 24 and a resilient member such as spring 26. The squib actuator 24 is operatively connected to the top portion of cartridge 20, and partially extends through an opening 28 in the top of protective case 16. The spring 22 has one end which abuts the plug 38 and the other end the cartridge 20, biasing the cartridge 20 toward the top portion of the case 16.

Fixedly secured within a recess 30 in the underside of plug 18 is a frangible or scored container 32 of any suitable material. The container 32 contains any suitable hydride such as uranium hydride ($UH_3$) 34. The top portion of scored container 32 is sealed by a plug 36 having mounted thereon a hollow pin 38 which protrudes through an opening 40 within plug 18. The wires 12 and 14 of the normally closed circuit are secured to the bottom of scored container 32 by any suitable fastening means 42.

MODE OF OPERATION

The mode of operation of the instant invention is described hereinbelow with reference to the FIGURE of the drawing.

Prior to the intended use of the salvage switch 10, the squib actuator 24 is remotely fired. The firing of the actuator 24 drives the hydrogen cartridge 20 forward against the spring 26 with such force as to allow the hollow pin 38 to pierce the closure element 22 of the hydrogen cartridge 20.

The released hydrogen gas then expands into the uranium hydride ($UH_3$) container 32. The partially depleted uranium hydride 34 absorbs the hydrogen gas and evolves heat. This heat will, at 3.8 atmospheres pressure of $H_2$, raise the temperature of the $UH_3$ to about 500°C. If there is an excess of hydrogen, the reaction will stabilize at an equilibrium of 500°C and 3.8 atmospheres.

The reason for heating the $UH_3$ to about 500°C is to allow all of the available heat from fission of the uranium atoms to raise the temperature about 500°C where the pressure increase per degree is much greater. If the uranium hydride starts out at the receipt of radiation at 25°C only about ½ atomsphere pressure increase will be generated from the radiation. If it starts from 500°C, as set forth above, the pressure increase would be around 13–15 atmospheres.

Therefore, when the uranium hydride at 500°C is subjected to a sufficient neutron pulse, a sharp rise in pressure occurs within container 32. This pressure build-up in the scored ($UH_3$) container 32 upon reaching the limitations of the scored container, ruptures the container 32 and simultaneously opens the normally closed circuit by breaking the wires 12 and 14. The breaking or opening of the circuit causes activation of safety devices or signaling means attached to a power plant.

Although the invention has been described with reference to a particular embodiment, it will be understood to those skilled in the art that the invention is capable of a variety of alternative embodiments within the spirit and scope of the appended claims.

I claim:

1. A salvage switch comprising a hollow protective case, said case containing therein a cartridge, an actuator operably associated with said cartridge and a biasing means for holding said cartridge in an inoperative position, a container having a piercing means operably attached thereto being mounted on the underside of said case, and said piercing means protruding into said case and being capable of penetrating said cartridge, whereby actuation of said actuator drives said cartridge against the force of said biasing means and into an operative position wherein said piercing means penetrates said cartridge.

2. A salvage switch as defined in claim 1 wherein said cartridge contains a gas and said container contains a hydride.

3. A salvage switch as defined in claim 2 wherein said hydride is uranium hydride.

4. A salvage switch as defined in claim 3 wherein said hydride is uranium hydride.

5. A salvage switch as defined in claim 1 wherein said container is of a frangible material.

6. A salvage switch as defined in claim 5 wherein said piercing means is a hollow pin.

7. A salvage switch as defined in claim 6 wherein said cartridge contains a gas and said container contains a hydride.

8. A salvage switch as defined in claim 6 wherein said biasing means is a spring.

9. A salvage switch as defined in claim 8 wherein a pair of wires are connected to said container.

10. A salvage switch as defined in claim 9 wherein said cartridge contains a gas and said container contains a hydride.

* * * * *